United States Patent [19]

Herron

[11] Patent Number: 4,944,384
[45] Date of Patent: Jul. 31, 1990

[54] TRASH DISCHARGE APPARATUS FOR CROP TRANSFERRING CONVEYOR MECHANISM

[75]. Inventor: Maynard M. Herron, Hesston, Kans.

[73] Assignee: Hay & Forage Industries, Hesston, Kans.

[21] Appl. No.: 303,632

[22] Filed: Jan. 30, 1989

[51] Int. Cl.$^5$ ............................................. B65G 45/00
[52] U.S. Cl. ................................... 198/494; 198/497; 198/841
[58] Field of Search ............... 198/497, 494, 836, 841, 198/499, 860.3, 838

[56] References Cited

U.S. PATENT DOCUMENTS

| | | | |
|---|---|---|---|
| 1,837,276 | 12/1931 | Levin | 198/497 |
| 2,168,622 | 8/1939 | Levin | 198/497 |
| 4,321,996 | 3/1982 | Sancken et al. | 198/499 |

Primary Examiner—Joseph E. Valenza
Attorney, Agent, or Firm—Hovey, Williams, Timmons & Collins

[57] ABSTRACT

A material-conveying apparatus includes an endless belt supported for travel in a path extending around a pair of rollers. A pair of support plates extend beneath the lateral edges of the belt along an upper run of the belt each of the support plates including an opening extending therethrough which permits material passing incidentally between the belt and the support plate to pass to an area beneath the support plate. A pair of deflection plates are disposed beneath the support plates. The deflection plates each include an upper edge which is disposed beneath and between the lateral edges of the upper run of the belt and extend downward and laterally outward relative to the upper run of the belt to a lower edge which is disposed laterally outward of the edges of the belt, whereby the material passing through the openings is directed by the deflection plates to an area laterally displaced from the lower run of the belt. Additionally, or alternatively, a scraper is disposed between the upper and lower runs of the belt and includes a scraper edge which contacts the inwardly directed surface of the endless belt along the lower run. The scraper edge is angled so that material incidentally coming to rest on the inwardly directed surface of the belt along the lower run is directed laterally outward with respect to the path of travel of the belt. A belt support surface disposed vertically above the scraper rests in contact with the inwardly directed surface of the endless belt and is adapted to inhibit material on the upper run of the endless belt from falling onto the lower run of the belt at any position of the lower run which is downstream of the scraper edge.

14 Claims, 2 Drawing Sheets

U.S. Patent     Jul. 31, 1990     Sheet 1 of 2     4,944,384
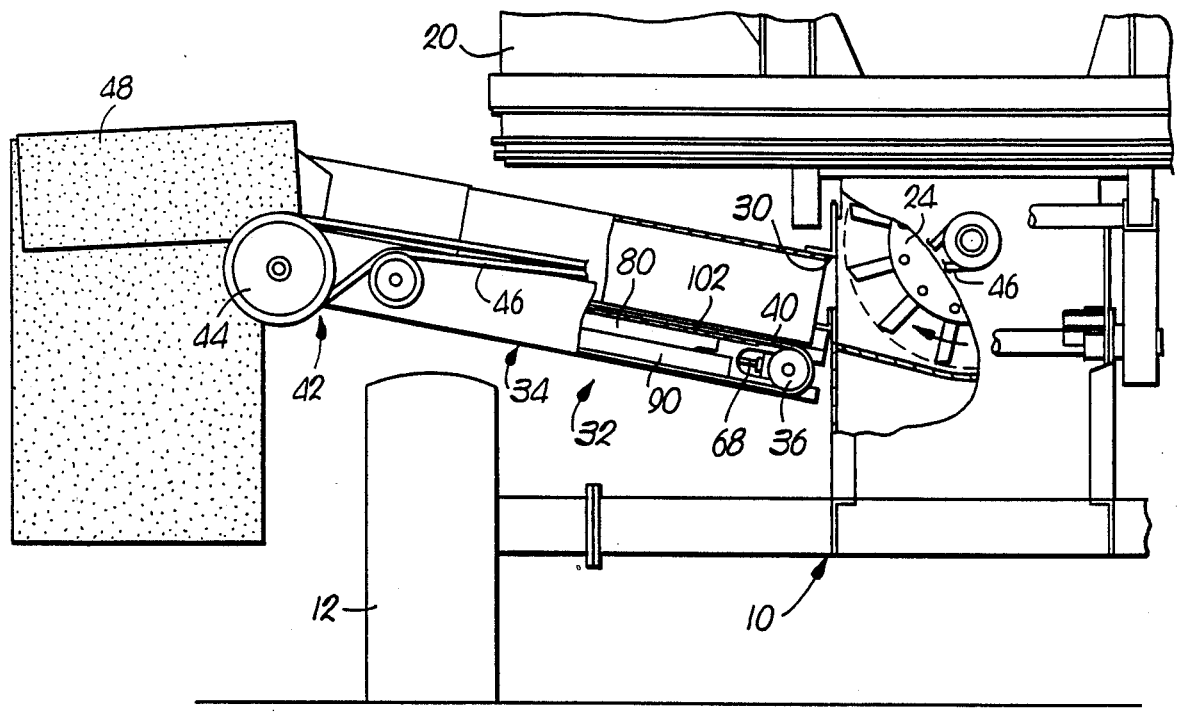
Fig.2.
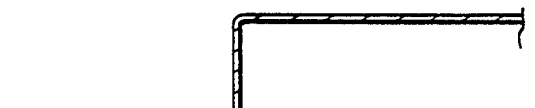
Fig.6.
Fig.1.
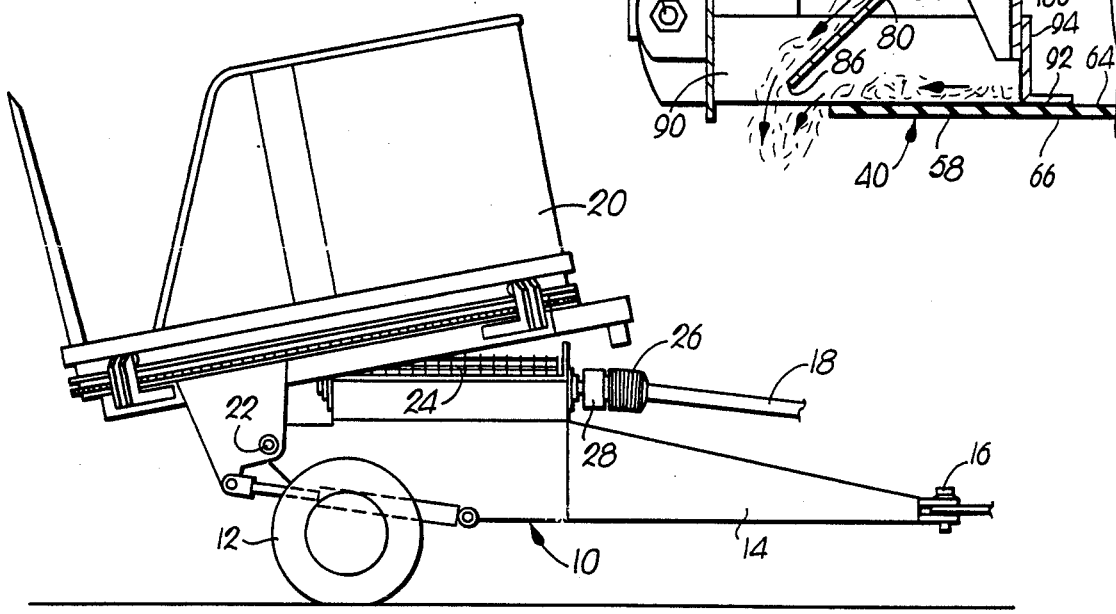

TRASH DISCHARGE APPARATUS FOR CROP TRANSFERRING CONVEYOR MECHANISM

BACKGROUND OF THE INVENTION

1. Field of the Invention

The present invention relates generally to conveyors and, more particularly, to a conveying apparatus including cleaning means which is useful in a crop material handling device.

2. Discussion of the Prior Art

The use of machines known as tilt-tub bale processors has gained widespread acceptance in recent years. The tub of such processors, as the name implies, may be tilted 90-degrees about a horizontal axis for loading large, round bales of hay by scooping the bales from the ground as the machine is backed toward and into them. Once loaded, the tub is returned to an upright position and the chopping rotor of the processor disintegrates the materials and directs the latter through a discharge spout. An example of a tilt-tub processor is described and illustrated in U.S. Pat. No. 4,448,361, dated May 15, 1984.

The discharge spout of conventional processors extends only a short distance outboard the processor such that material disintegrated by the rotor is propelled through the spout by the rotor. However, where it is desired that the material be delivered directly from the processor to a trough or bunk, it becomes necessary to employ additional means to transport the material from the spout to the desired location.

A conveyor may be employed as an attachment to the processor which forms an extension of the spout and which provides additional means for delivering processed material to a location remote from the spout. However, in known conveyors of this type, several problems exist. For example, regardless of the structure used to seal the sides of the conveyor belt from leakage, material incidentally finds its way between the upper and lower runs of the belt and into the inside of the conveyor belt assembly. This material, in turn, tends to vibrate toward the rollers at opposite ends of the conveyor assembly and causes the rollers to become heavy-laden with the material. As a result of this occurrence, the rollers become oversized and the belt begins to track strangely and may flop around, thus resulting in premature deterioration of the belt and the rollers. In addition, the material tends to work into the bearings supporting the rollers causing them also to fail prematurely.

Because material is continuously able to work its way between the upper and lower runs of the belt, the conveyor eventually will clog up and the belt will not run at all, or may slip on its power roller. In order to remedy the problem, an operator may have to stop the processor after every few bales have been processed in order to unplug the materials and clean out the conveyor. It is desired that a conveyor assembly be constructed which will remedy these problems without requiring such frequent service.

OBJECTS AND SUMMARY OF THE INVENTION

An object of the present invention is to provide a material conveying apparatus in which material reaching the sides of the upper run of the belt is discharged from the apparatus without reaching the lower run of the belt and without becoming trapped within the conveying apparatus or the conveyor rollers.

It is a further object of the invention to provide an apparatus which ensures that any material reaching the lower run of the conveyor belt is deflected laterally outward to the outside edges of the conveyor belt so as to be discharged from the apparatus.

In accordance with one aspect of the invention, the conveying apparatus includes, among other features, a pair of support plates extending beneath lateral edges of the belt along an upper run thereof, each of the support plates including an opening extending therethrough which permits material passing incidentally between the belt and the support plate to pass through the opening to an area beneath the support plate. In addition a pair of deflection plates are provided each being disposed in the area beneath the support plate and beneath the belt and the opening of one of the belt support plates. The deflection plates each include an upper edge which is disposed beneath and between the lateral edges of the upper run of the belt and extend downward and laterally outward relative to the upper run of the belt to a lower edge which is disposed laterally outward of the edges of the belt, whereby the material passing through the at least one opening is directed by the deflection plates to an area laterally displaced from the lower run of the belt.

According to another facet of the invention, the conveying apparatus includes, among other features, a scraper disposed between the upper and lower runs of the belt and including a scraper edge which contacts the inwardly directed surface of the endless belt. The scraper edge is angled relative to the first and second axes, as well as to the path of travel of the belt so that material incidentally coming to rest on the inwardly directed surface of the belt along the lower run is directed laterally outward with respect to the path of travel of the belt. A belt support surface is disposed vertically above the scraper in contact with the inwardly directed surface of the endless belt, the belt support surface including a first edge adjacent the first roller and being adapted to inhibit material on the upper run of the endless belt from falling onto the lower run of the belt at any position of the lower run which is downstream of the scraper edge.

BRIEF DESCRIPTION OF THE DRAWING FIGURES

A detailed description of a preferred embodiment of the inventive apparatus is described below with reference to the attached drawing figures, wherein:

FIG. 1 is a side view of a tilt-tub bale processor in which the present invention may be employed;

FIG. 2 is a fractional rear view of a tilt-tub processor partially cut away to illustrate the operating structure of the processor and of a conveying apparatus constructed in accordance with the invention;

FIG. 6 is a fractional sectional view of the conveying apparatus taken along line 6—6 of FIG. 4.

DETAILED DESCRIPTION OF A PREFERRED EMBODIMENT

Figure 3:
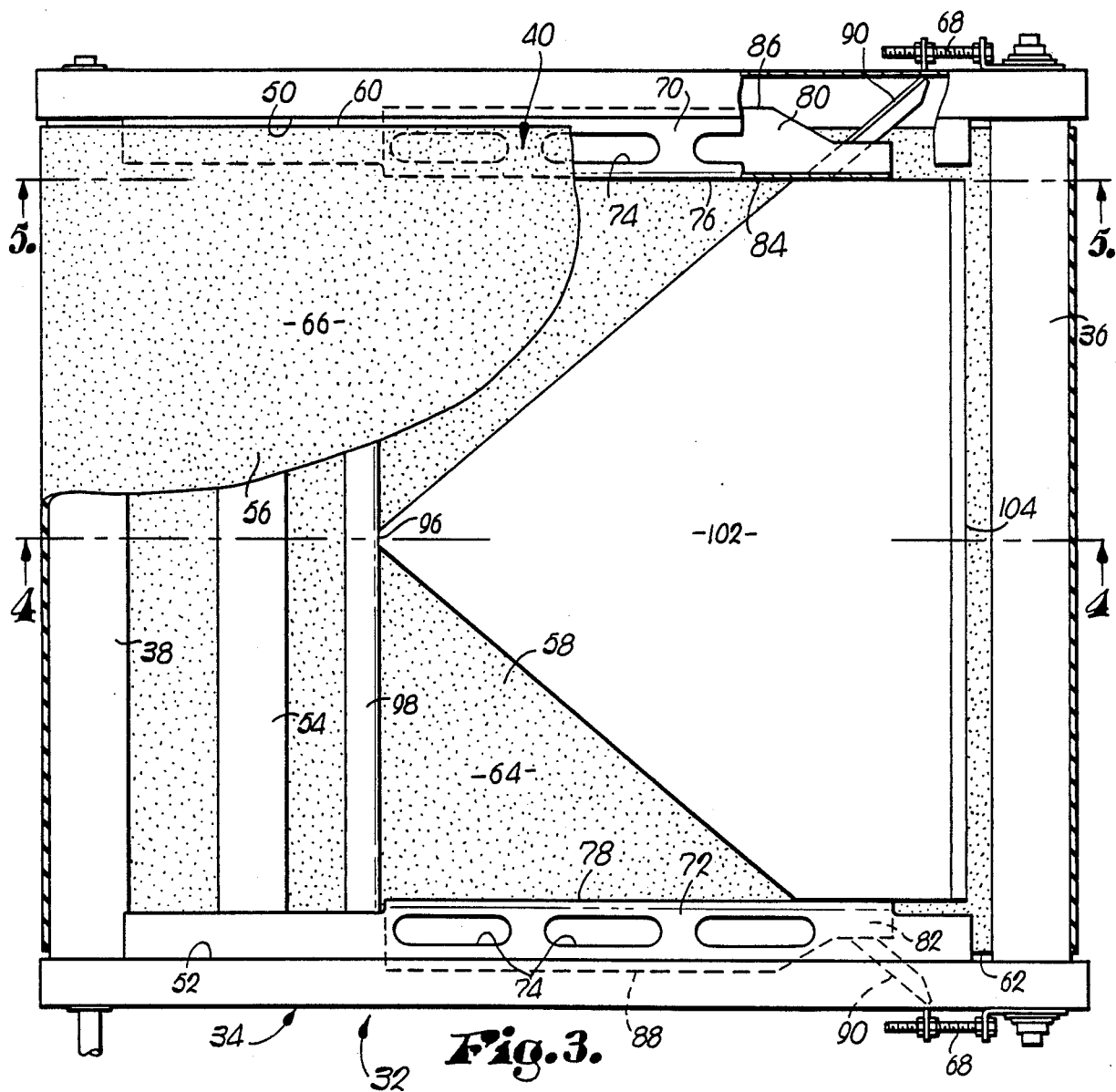
FIG. 3 is a top view of a conveyor made in accordance with the invention, with an upper run of the belt partially cut away to show the structure of the conveying apparatus.

A tilt-tub bale processor is illustrated in FIG. 1, and includes a chassis 10 mounted on a pair of wheels 12 for advancement along a path of travel over the ground as determined by a towing vehicle (not shown). A fore-and-aft extending tongue 14 of the processor has a hitch 16 adapted for releasable connection with the towing vehicle and a drive shaft 18 extends above the tongue 14 and is adapted to be connected to a source of rotary power such as a power take-off unit of the towing vehicle.

The processor includes a tub 20 connected to the chassis 10 by means of a pivot 22 for movement about a horizontal axis between an upright processing position and a tilted loading position. A rotor 24 is connected to the drive shaft 18 by a universal joint 26 and clutch 28, and rotates relative to the chassis 10 during processing of a bale in order to disintegrate bale material within reach of the rotor and eject the disintegrated material from the processor.

As illustrated in FIG. 2, a discharge opening 30 is disposed laterally of the rotor 24 and extends only a short distance outboard of the chassis 10 of the processor. A conveying apparatus 32 constructed in accordance with the invention is attached to the opening 30 and forms an extension which projects beyond a wheel 12 of the processor so that material being disintegrated by the processor may be delivered directly to a trough or bunk (not shown). The conveying apparatus 32 includes a frame 34 enclosing a pair of rollers 36, 38 and an endless belt 40. A conveyor drive means 42 is provided on one of the rollers 38 and includes a drive pulley 44 connected by a belt 46 to the drive shaft 18. A hood 48 or other similar means is also provided adjacent a discharge end of the conveying apparatus for containing material being discharged from the apparatus 32 and for directing the material into a trough or bunk therebelow.

The conveying apparatus 32 is illustrated in more detail in FIG. 3. The frame 34 includes a pair of parallel elongated side walls 50, 52 and a rigid cross support member or cylinder 54. One of the guide rollers 36 referred to herein as the first guide roller is mounted on the frame 34 adjacent one of the ends of the elongated side walls 50, 52 for rotation about a first axis of rotation and the other, second guide roller 38, is mounted on the frame 34 adjacent the opposite ends of the elongated side walls 50, 52 for rotation about a second axis of rotation spaced from and parallel with the first axis.

Figure 4:
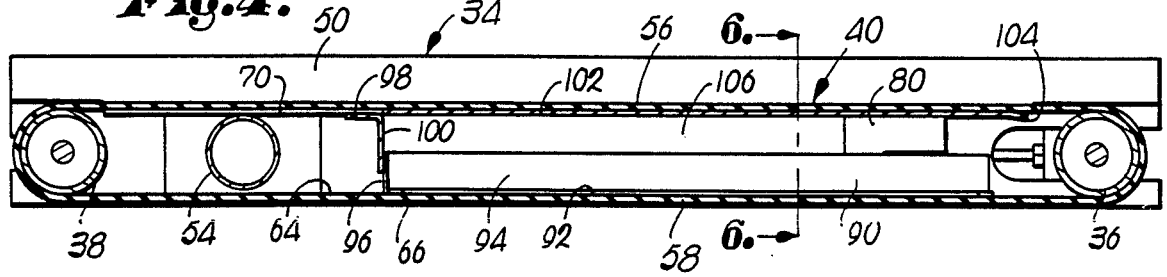
FIG. 4 is a sectional view of the conveying apparatus taken along line 4—4 of FIG. 3.

As shown in FIG. 4, the endless belt 40 is supported on the first and second guide rollers 36, 38 for travel in a closed path extending around the first roller 36, along an upper run 56, around the second roller 38 and along a lower run 58. Returning also to FIG. 3, the belt 40 includes lateral edges 60, 62 and inwardly and outwardly directed surfaces 64, 66. The inwardly directed surface 64 is exposed to the rollers 36, 38 and to the interior of the closed path of travel of the belt while the outwardly directed surface 66 is always exposed to the exterior of the closed path of travel of the belt 40.

Material is conveyed by the apparatus 32 on the outwardly directed surface 66 between the first and second rollers 36, 38 during travel of the belt 40 along the upper run. In order to adjust the tension in the belt 40 to ensure proper operation of the apparatus, adjustment means such as threaded shafts 68 may be provided at the axial ends of the first roller 36 which permit an operator to move the first roller in a direction perpendicular to its axis toward or away from the second roller 38. The second roller 38 is not movable in the direction perpendicular to its axis in the preferred embodiment since the second roller is the power roller and is connected with the drive shaft 18 by a belt 46.

A pair of support plates 70, 72 extend beneath the lateral edges 60, 62 of the belt 40 along the central region of the upper run 56. Each of the support plates 70, 72 includes three openings 74 extending therethrough which permit material passing incidentally between the belt 40 and the support plates 70, 72 to pass through the openings 74 to an area beneath the support plates and interior of the closed path of travel of the belt. In the preferred embodiment, each of the support plates 70, 72 is formed as an extension of one of the side walls 50, 52 of the apparatus and extends laterally inward from the side wall to an edge 76, 78 located inward of the adjacent lateral edge 60, 62 of the endless belt 40.

A deflection plate 80, 82 is disposed in the area beneath each of the support plates 70, 72, and includes an upper edge 84 disposed beneath and between the lateral edges 60, 62 of the belt 40 as it travels along the upper run 56 and extending downward and laterally outward relative to the upper run 56 to a lower edge 86, 88 which is disposed laterally outward of the edges 60, 62 of the belt. In the preferred embodiment, the deflection plates 80, 82 are formed integrally with the support plates 70, 72 and the side walls 50, 52 in order to reduce the cost of construction and to minimize leakage from the apparatus 32. As shown in FIG. 6, material passing through the openings 74 in the support plates 70, 72 is directed by the deflection plates 80, 82 to an area laterally displaced from the belt passing along the lower run 58.

In FIG. 4, a scraper 90 is illustrated which is disposed between the upper and lower runs 56, 58 of the belt and which includes a scraper edge or surface 92 contacting the inwardly directed surface 64 of the endless belt 40 as the belt travels along the lower run 58. The scraper edge 92 extends at an angle relative to the first and second axes, as well as to the directions of the path of travel of the belt so that material coming to rest on the inwardly directed surface 64 of the belt along the lower run 58 is directed laterally outward with respect to the path of travel of the belt in a manner as illustrated in FIG. 6.

The scraper 90 is preferably a V-shaped scraper constructed of a bar material having an L-shaped cross-section with a horizontal arm 92 which forms the scraping edge or surface and a vertical arm 94 which permits connection of the scraper 90 to the frame 34. The scraper shape includes an apex 96 which is oriented to point in a direction opposite to that of the travel of the belt along the path of the lower run (to the left in FIG. 3). By orienting the scraper 90 in this way, material resting on the belt 40 as it travels along the lower run 58 is scraped toward the edges of the belt and is permitted to fall from the belt before reaching the first roller 36. A cross bar 98 of an inverted L-shaped cross-section extends between the side walls 50, 52 at a point intermediate the rollers 36, 38 and provides a surface 100 to which the vertical arm 94 at the apex 96 of the scraper 90 is mounted.

A belt support surface 102 is disposed vertically above the scraper 90 in contact with the inwardly directed surface 64 of the belt 40 as the belt travels along the upper run. The belt support surface 102 includes a first edge 104 adjacent the first roller 36 which is angled somewhat relative to the plane in which the surface 102 is disposed to permit any material stuck on the belt 40 to be guided between the belt and the surface and transported along the upper run 56 with the belt. The surface 102 is provided to inhibit material on the inwardly directed surface 64 of the belt along the upper run from falling onto the lower run 58 at any position of the lower run which is downstream of the scraper edge relative to the direction of travel of the belt along the lower run. Any material which still remains on the inwardly directed surface of the belt after passing the scraper 90 is retained on the belt during travel over the support surface 102 and is permitted to leave the belt only after the belt has completely passed over the scraper 90. In this manner, additional means are provided for preventing material from reaching the rollers 36, 38 and complicating the operation thereof.

The manner in which the scraper 90 and support surface 102 are attached to the cross bar 98 is shown in FIG. 4. The support surface 102 is formed of a flat preferably V-shaped plate having a downward extending flange 106 along the edge thereof which is fastened to the vertical arm 94 of the scraper 90. Thus, the scraper and support surface are connected by a continuous wall formed jointly by the vertical arm 94 of the scraper 90 and the downward extending flange 106 of the surface 102. This wall serves not only as a means for stabilizing the scraper and support surface, but also prevents material from jumping the scraper and reaching the first roller.

Figure 5:
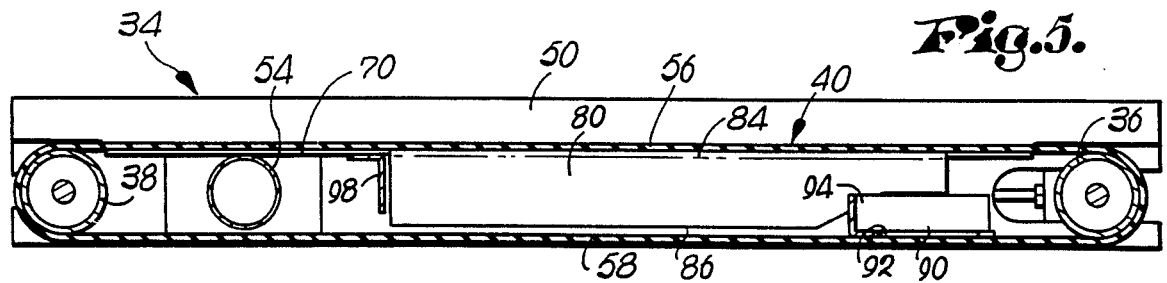
FIG. 5 is a sectional view of the conveying apparatus taken along line 5—5 of FIG. 3.

FIG. 5 is a cross-sectional view illustrating the relative position of the deflection plates 80, 82 relative to the scraper 90 and the cross bar 98. In the preferred embodiment, the deflection plates 80, 82 extend in one axial direction to a position adjacent the point of intersection between the scraper 90 and the lateral edges 60, 62 of the belt 40, and in the opposite direction to a position adjacent the cross bar 98. The openings 74 in the support plates 70, 72 are, in turn, equally spaced along the extent of the deflection plates 80, 82.

The cooperation of the support plates 70, 72, deflection plates 80, 82, scraper 90 and support surface 102 is shown in FIG. 6. During operation of the conveying apparatus, material is conveyed by the outwardly extending surface 66 of the endless belt 40 along the upper run 56 between the first and second rollers 36, 38. As the material is conveyed, some of the material may reach the lateral edges 60, 62 of the belt and become worked between the belt and the support plates 70, 72. If such leakage occurs, the material is forced by the belt 40 through one of the openings 74 in the support plate into the region directly underlying the support plates. This material then comes into contact with one of the deflection plates 80, 82 which direct the material laterally outward to a position exterior of the closed path of the belt and the material is permitted to fall from the apparatus. Should material work its way into the interior of the closed path of the belt and onto the inwardly directed surface 64 along the lower run, the material is directed laterally of the belt by the scraper 90 to a position outside the closed path of the belt and is again permitted to fall from the apparatus. However, where the material is stuck to the belt 40 with sufficient force to escape the scraping action of the scraper, or if the material gets by the scraper in any other manner, such as during minor vibration of the belt, the material is carried by the belt around the first roller 36 and is engaged by the support surface 102 which prevents the material from falling from the belt immediately back onto the lower run 58. Instead, the material is carried between the belt 40 and the support surface 102 to a point upstream of the scraper 90 with respect to the direction of travel of the belt as it travels along the lower run. In this manner, the material is permitted to fall from the belt as it travels along the upper run only when it has traveled far enough that it must again pass the scraper once it falls onto the belt along the lower run.

Although the invention has been described with reference to a preferred embodiment, it is understood that substitutions may be made and equivalents employed herein without departing from the scope of the invention as set forth in the claims.

What is claimed is:

1. A material-conveying apparatus comprising:
a frame;
a first guide roller mounted on the frame for rotation about a first axis;
a second guide roller mounted on the frame for rotation about a second axis spaced from and parallel with the first axis;
an endless belt including lateral edges and being supported on the first and second guide rollers for travel in a path extending around the first roller, along an upper run, around the second roller and along a lower run, the belt being adapted to convey material along the upper run during travel of the belt;
a pair of support plates each extending beneath one of the lateral edges of the belt along the upper run, each of the support plates including an opening extending therethrough which permits material passing incidentally between the belt and the support plate to pass through the opening to an area beneath the support plate; and
a pair of deflection plates each disposed in the area beneath the belt and directly beneath the opening of one of the belt support plates, the deflection plates each including an upper edge which is disposed laterally inward of the opening beneath which the deflection plate is disposed and extending downward and laterally outward relative to the upper run of the belt to a lower edge which is disposed laterally outward of one of the edges of the belt, whereby the material passing through the openings is directed by the deflection plates to an area laterally displaced from the lower run of the belt.

2. A material-conveying apparatus comprising:
a frame;
a first guide roller mounted on the frame for rotation about a first axis;
a second guide roller mounted on the frame for rotation about a second axis spaced from and parallel with the first axis;
an endless belt including lateral edges and being supported on the first and second guide rollers for travel in a path extending around the first roller, along an upper run, around the second roller and along a lower run, the belt being adapted to convey material along the upper run during travel of the belt;
a pair of support plates each including inner and outer lateral edges and extending beneath the lateral edges of the belt along the upper run, each of the support plates including an opening extending therethrough which permits material passing incidentally between the belt and the support plate to pass through the opening to an area beneath the support plate; and a pair of deflection plates each disposed in the area beneath the support plate and beneath the belt and the opening of one of the belt support plates, the deflection plates each including an upper edge which is disposed beneath and between the lateral edges of the upper run of the belt and extending downward and laterally outward relative to the upper run of the belt to a lower edge which is disposed laterally outward of the edges of the belt, the inner lateral edge of each of the support plates being connected to the upper edge of one of the deflection plates, whereby the material passing through the openings is directed by the deflection plates to an area laterally displaced from the lower run of the belt.

3. The material-conveying apparatus as set forth in claim 2, further comprising side plates connected to the outer lateral edges of the support plates and extending vertically upward from the support plates.

4. The material-conveying apparatus as set forth in claim 1, wherein the endless belt further includes an inwardly directed surface and an outwardly directed surface, the apparatus further comprising cleaning means for cleaning the inwardly directed surface of the belt as the belt travels along the lower run.

5. The material-conveying apparatus as set forth in claim 4, wherein the cleaning means further includes a scraper bar in contact with the inwardly directed surface of the belt, the scraper bar being disposed at an angle to the first and second axes and to the path of travel of the belt along the lower run so that the bar scrapes material resting on the belt to a position laterally outward with respect to the path of travel of the belt.

6. The material-conveying apparatus as set forth in claim 5, wherein the scraper bar is a V-shaped bar having an apex pointing in a direction opposite to the direction of travel of the belt along the lower run.

7. The material-conveying apparatus as set forth in claim 5, wherein the scraper bar is formed of an L-shaped bar including a lower flange which contacts the inwardly directed surface of the belt as the belt travels along the lower run.

8. The material-conveying apparatus as set forth in claim 4, further comprising a belt support surface disposed vertically above the cleaning means in contact with the inwardly directed surface of the endless belt, the belt support surface including a first edge adjacent the first roller and being adapted to inhibit material on the upper run of the endless belt from falling onto the lower run of the belt at any position of the lower run which is downstream of the cleaning means relative to the direction of travel of the belt along the lower run.

9. A material-conveying apparatus for use in a crop material-handling device, the apparatus comprising:
a frame;
a first guide roller mounted on the frame for rotation about a first axis;
a second guide roller mounted on the frame for rotation about a second axis spaced from and parallel with the first axis;

an endless belt supported on the first and second guide rollers for travel in a path extending around the first roller, along an upper run, around the second roller and along a lower run, the belt including lateral edges, an inwardly directed surface and an outwardly directed surface and being adapted to convey material on the outwardly directed surface along the upper run during travel of the belt;

a pair of support plates each extending beneath one of the lateral edges of the belt along the upper run, each of the support plates including an opening extending therethrough which permits material passing incidentally between the belt and support plate to pass through the opening to an area beneath the support plate;

a pair of deflection plates each disposed in the area beneath the belt and directly beneath the opening of one of the belt support plates, the deflection plates each including an upper edge which is disposed laterally inward of the opening beneath which the deflection plate is disposed and extending downward and laterally outward relative to the upper run of the belt to a lower edge which is disposed laterally outward of one of the edges of the belt, whereby the material passing through the openings is directed by the deflection plates to an area laterally displaced from the lower run of the belt;

a scraper disposed between the upper and lower runs of the belt and including a scraper edge which contacts the inwardly directed surface of the endless belt along the lower run, the scraper edge being angled relative to the first and second axes, as well as to the path of travel of the belt along the lower run so that material incidentally coming to rest on the inwardly directed surface of the belt along the lower run is directed laterally outward with respect to the path of travel of the belt; and a belt support surface disposed vertically above the scraper in contact with the inwardly directed surface of the endless belt, the belt support surface including a first edge adjacent the first roller and being adapted to inhibit material on the upper run of the endless belt from falling onto the lower run of the belt at any position of the lower run which is downstream of the scraper edge relative to the direction of travel of the belt along the lower run.

10. A conveying apparatus for use in a crop material-handling device, the apparatus comprising:
a frame;
a first guide roller mounted on the frame for rotation about a first axis;
a second guide roller mounted on the frame for rotation about a second axis spaced from and parallel with the first axis;
an endless belt supported on the first and second guide rollers for travel in a path extending around the first roller, along an upper run, around the second roller and along a lower run, the belt including lateral edges, an inwardly directed surface and an outwardly directed surface and being adapted to convey material on the outwardly directed surface along the upper run during travel of the belt;
a pair of support plates each including inner and outer lateral edges and extending beneath the lateral edges of the belt along the upper run, each of the support plates including an opening extending therethrough which permits material passing incidentally between the belt and support plate to pass through the opening to an area beneath the support plate;

a pair of deflection plates each disposed in the area beneath the support plate and beneath the belt and the opening of one of the belt support plates, the deflection plates each including an upper edge which is disposed beneath and between the lateral edges of the upper run of the belt and extending downward and laterally outward relative to the upper run of the belt to a lower edge which is disposed laterally outward of the edges of the belt, the inner lateral edge of each of the deflection plates being connected to the upper edge of one of the deflection plates whereby the material passing through the openings is directed by the deflection plates to an area laterally displaced from the lower run of the belt;

a scraper disposed between the upper and lower runs of the belt and including a scraper edge which contacts the inwardly directed surface of the endless belt along the lower run, the scraper edge being angled relative to the first and second axes, as well as to the path of travel of the belt along the lower run so that material incidentally coming to rest on the inwardly directed surface of the belt along the lower run is directed laterally outward with respect to the path of travel of the belt; and a belt support surface disposed vertically above the scraper in contact with the inwardly directed surface of the endless belt, the first edge adjacent the first roller and being adapted to inhibit material on the upper run of the endless belt from falling onto the lower run of the belt at any position of the lower run which is downstream of the scraper edge relative to the direction of travel of the belt along the lower run.

11. The conveying apparatus as set forth in claim 10, further comprising side plates connected to the outer lateral edges of the support plates and extending vertically upward from the support plates.

12. The conveying apparatus as set forth in claim 9, wherein the scraper includes a V-shaped bar having an apex pointing in a direction opposite to the direction of travel of the belt along the lower run.

13. The conveying apparatus as set forth in claim 9, wherein the belt support surface is V-shaped and includes an apex disposed vertically above the apex of the V-shaped bar.

14. The conveying apparatus as set forth in claim 9, wherein the scraper includes an L-shaped bar having a lower flange which contacts the inwardly directed surface of the belt as the belt travels along the lower run.

* * * * *